UNITED STATES PATENT OFFICE.

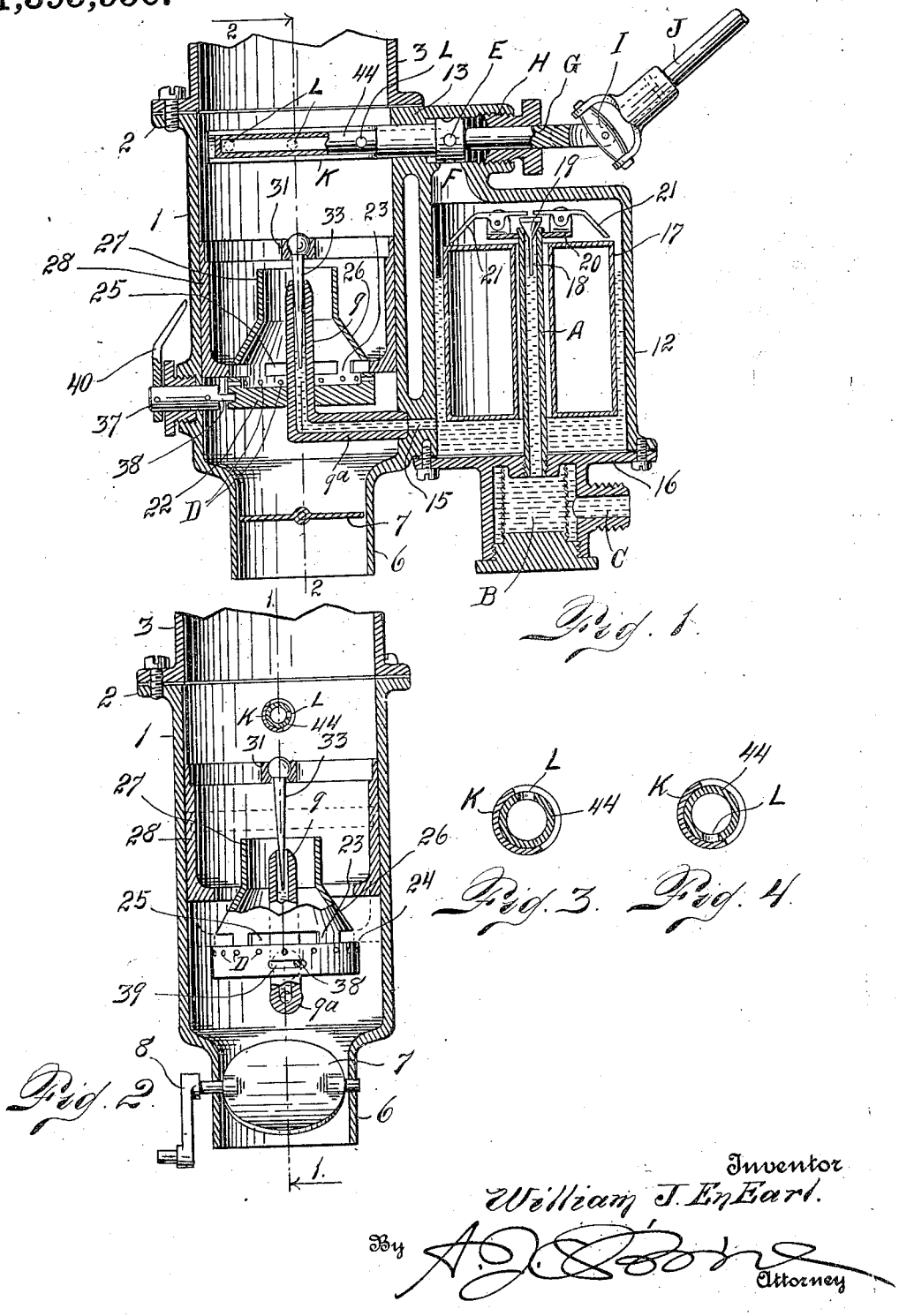

WILLIAM J. EN EARL, OF MONTE VISTA, COLORADO, ASSIGNOR TO THE VACUUM CARBURETOR COMPANY, OF MONTE VISTA, COLORADO, A CORPORATION OF COLORADO.

VACUUM-CARBURETER.

1,395,950.     Specification of Letters Patent.     Patented Nov. 1, 1921.

Application filed March 28, 1917. Serial No. 158,077.

*To all whom it may concern:*

Be it known that I, WILLIAM J. EN EARL, a citizen of the United States, residing at Monte Vista, in the county of Rio Grande and State of Colorado, have invented certain new and useful Improvements in Vacuum-Carbureters; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention appertains to carbureters and is particularly an improvement over the vacuum carbureters disclosed in my previous Patent No. 1,195,343 dated August 22, 1916; and for the most part is a continuation of my previous application filed April 12, 1916, Serial No. 90,716. The primary object of the invention is to provide a carbureter having means whereby the suction created by the engine tends to create a vacuum in the fuel reservoir, thereby sucking the fuel from the tank into the reservoir of the carbureter, even though the fuel tank be at a lower level than the carbureter, in order that an adequate supply of fuel may be delivered to the fuel nozzle of the carbureter under all conditions.

A source of carbureter trouble lies in the fact that difficulty has been experienced in delivering the fuel from the tank to the carbureter. If a gravity feed is used, the fuel tank must be at a higher level than the carbureter under all conditions, so that the carbureter must be at an exceedingly low point or the tank must be elevated. This is objectionable in automobile construction, since the fuel tank generally encumbers the machine and is located at an objectionable or dangerous point. The logical place for the fuel tank is at the rear of the automobile, and when this is the case, the fuel must either be forced from the tank under pressure to the carbureter, or in accordance with some systems now in use, the fuel is sucked from the tank into a secondary or supplemental tank at a higher level than the carbureter from which supplemental tank the fuel flows by gravity to the carbureter. With this system the supplemental tank including the working parts and connections entail additional expense both in original cost and installation.

The present invention resides in the provision of a carbureter having means whereby the suction created by the engine extends into the fuel reservoir of the carbureter, whereby the fuel will be drawn from the tank at any position thereof into the fuel reservoir, thus providing for an adequate delivery of fuel from the fuel nozzle under all conditions, and eliminating the use of a supplemental elevated tank and accompanying parts. In other words, the present invention embodies the vacuum system in the carbureter itself, thus eliminating the expense and trouble incident to vacuum systems now in use and accomplishing the same results with a carbureter which can be manufactured at practically the same cost as ordinary ones.

Another object of the invention is to provide novel means for bringing the upper portion of the fuel reservoir of the carbureter into communication with the air passage thereof in order that the desired results may be carried out in a satisfactory and thoroughly efficient manner.

Still another object of the invention is the provision of novel means in the carbureter for controlling the primary and secondary air currents, and means for enriching the mixture and for priming the carbureter.

It is also within the scope of the invention to provide a carbureter having the characteristics above noted, and which at the same time is comparatively simple and inexpensive in construction, as well as practical and serviceable.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Having outlined my improved construction as well as the function it is intended to subserve, I will proceed to describe the same in detail, reference being made to the accompanying drawing in which is illustrated an embodiment thereof. In this drawing:—

Figure 1 is a central vertical section of the carbureter with portions shown in elevation, the section being taken on the line 1—1, Fig. 2.

Fig. 2 is a section taken on the line 2—2 Fig. 1.

Figs. 3 and 4 are cross sections of the adjustable device for controlling the suction in the fuel reservoir.

The present carbureter embodies an upright tubular body 1 forming a part of the air passage and said body 1 is provided at its upper end with a flange 2 or other means for attaching the carbureter to the intake manifold 3 of the engine. The carbureter is provided with a depending air inlet member 6 which is a continuation of the body, though somewhat reduced in diameter, and in which the throttle valve 7 (preferably of the butterfly type) is mounted, a throttle lever or crank arm 8 being connected to the valve 7 in the ordinary manner for operating it.

The body 1 is provided with an upstanding fuel nozzle 9 from whose lower extremity extends a horizontal portion $9^a$. The body 1 forms a support for the fuel nozzle 9 which is angle shaped and composed of an upright member and a horizontally disposed member. At one side of the body 1 is a fuel reservoir 12, said reservoir normally having the liquid at a sufficient height therein to be approximately on a level with the upright extremity of the fuel nozzle. Hence I must have a suction feed under all conditions and this is obtained by reason of the differential between the suction immediately adjacent the nozzle and that in the upper portion of the fuel reservoir as hereinafter more fully explained. The upper portion of the reservoir 12 is united with the upper end of the body 1 by a portion 13, said body 1 and reservoir 12 being preferably integral and cast from suitable metal. The reservoir 12 is integral with one side of the body 1 and said side wall is provided with a horizontal passage or duct 15 with which the lower portion of the body 1 is provided. The horizontal portion of the fuel nozzle 9 is connected with the body in such a manner that the passage of the said nozzle registers with a passage 15, thus placing the fuel nozzle in communication with the liquid in the reservoir 12. The latter is provided with a removable bottom member 16 into which is threaded the lower extremity of a vertically disposed tube A upon which the float 17 slides freely in a vertical direction. The lower end of this tube A is in communication with a bottom chamber B into which the liquid fuel enters by way of a nipple C which is connected with the source of supply not shown. The upper extremity of the tube A is open to permit the liquid fuel to enter the reservoir 12 by overflowing at the top of said tube, the upper extremity of this tube being equipped with a valve 19 having a short depending stem 18. The opening movement of the valve 19 is controlled by triggers 21 which are pivotally mounted on a support 20, the latter being carried by the tube A whose upper extremity passes through an opening formed in said support. Hence as the float rises from the fuel reservoir so that the triggers are engaged thereby the valve will be held in the seated position, since the inner extremities of the said triggers overlap the upper extremity of the valve. (See Fig. 1). Hence the fuel is maintained at its normal level in the reservoir, because when the fuel level lowers, the float can lower, thus permitting the valve to move upwardly so that it will be opened by the pressure of the liquid entering the said reservoir by way of the tube A.

In order to control the flow of air from the inlet member 6 into the body 1, an annular member 22 is slidable upon the lower vertical portion of the nozzle 9 and is supported by said nozzle which itself is stationary with the body 1 as heretofore explained. Extending upwardly from the member 22 is an annular portion 23 and connected with such portion is a frusto-conical member 26 provided at its upper end with a contracted cylindrical nozzle 27 surrounding and projecting above the tip of the fuel nozzle 9, and providing a constricted portion of the air passage into which the fuel nozzle 9 projects.

Mounted for vertical movement within the body 1 is a sleeve 28 providing a valve slidably fitting the walls of the body 1 which guide the sleeve 28 for vertical movement. The lower end of the sleeve 28 is adapted to snugly surround the portion 23 for closing apertures 25 when the sleeve 28 is at its lowest limit of movement. The sleeve 28 is seatable upon a shoulder 24 with which the part 23 of the annular member 22 is provided so that the lower end of the sleeve can only move far enough downwardly to close the said apertures. The annular member 23 below the sleeve is equipped with a series of relatively small perforations D which are always open to allow air from the inlet member 6 to pass into the frusto-conical member, and thence upwardly through the air passage of the carbureter which leads to the engine intake 3.

The upper end of the sleeve 28 is provided with a bridging member 31 to which the upper end of a needle valve 33 is secured, said valve having a downwardly tapered portion which enters the tip of the fuel nozzle 9 and extends downwardly thereinto a sufficient distance to prevent its escape therefrom, when the sleeve 28 is at its limit of upward movement. The valve 33 is normally in position to approximately close the tip of the fuel nozzle 9, but is always slightly open in order to supply the necessary fuel which in conjunction with the small amount of air passing through the constantly opened perforations D, will supply the necessary explosive mixture for operating the engine when idle or when not under load as when the clutch is thrown out.

As a means for adjusting the member 22 in order to lift the sleeve 28 and properly open the needle valve for the normal working condition, a spindle 37 is journaled for rotation through one wall of the body 1 and is provided at its inner end with an eccentric projection 38 which enters a slot 39 of the member 22, an arm or lever 40 being attached to the outer end of the spindle 37 for rocking or oscillating it. Hence it will be understood that as the spindle is actuated, limited vertical movement may be imparted to the member 22 for the purpose desired.

A salient feature of the invention is the provision of a hollow rotatably adjustable tubular member 44 for establishing communication between the upper portion of the reservoir 12 and the air suction passage which is in communication with the intake of the engine and for controlling the pressure in the reservoir 12. This member 44 is journaled in the upper portion of the tubular body 1 and its portion which enters the air suction passage is provided with a number of perforations L which form communication between the air suction passage and the upper portion of the reservoir 12, through the medium of the tube 44 and perforations E formed therein and in communication with an opening F in the top of the reservoir 12. The member 44 is also provided with a stem G which passes through a stuffing-box H and extends beyond the same where it has a universal joint connection I with a rod J which is accessible to the chauffeur or person in charge of the machine upon which the carbureter is located, whereby the cylindrical member 44 may be rotatably adjusted for regulating the suction. Stationary within the air suction passage is a casing K which is curved to fit the curvature of the member 44, the casing, however, being cut away for about half of its circumference to expose the member 44, whereby the perforations L of the said member may be placed in communication with the air suction passage and consequently in communication with the upper part of the reservoir 12 as heretofore explained, or these perforations L may be practically closed by the casing K. It will be understood that the rotatably adjustable cylindrical member 44 is provided with a single row of perforations which are in alinement, whereby they may all be practically closed by the casing K, or all opened to the air suction passage, or partially closed or opened as may be desired.

During the priming or starting of the engine, when the entire suction is needed for drawing the initial charge of liquid fuel through the air suction passage in order to obtain a relatively rich explosive mixture, the adjustable member 44 will be rotated to cut off the perforations L of the portion of the said member which projects into the air suction passage.

In this position, a very rich mixture will be obtained momentarily at least, the pressure in the upper portion of the reservoir being atmospheric initially. As the engine picks up the member 44 will be rotated by the operator so that the apertures L will clear the casing K but still be on the under side of the tube 44. In this position there will be a tendency for the pressure in the top of the reservoir 12 to reduce to the sub-atmospheric pressure in the air passage; however, it will not fall quite so low due to the direction of the flow of the mixture in the air passage and the position of the apertures L. As the engine gets under way, the member 44 may be rotated further, and, as the apertures move from a horizontal position toward the vertical position of Fig. 3, a lower and lower pressure will be obtained in the upper portion of the reservoir 12 due to the inspirator or suction effect which the velocity of the mixture in the air passage will have on the mixture in the tube 44.

Hence, a gradually decreasing flow of liquid from the fuel nozzle results giving a leaner mixture. However, as has been determined by experiment, a much lower pressure is obtained at the tip of the fuel nozzle due to the velocity of the air at this point, than is obtained at the point where member 44 is positioned.

As a result a properly regulated flow from the fuel nozzle may be obtained at all times.

When the fuel reservoir is located as illustrated in the drawing or in such a manner that the liquid fuel cannot flow by gravity from the tip of the nozzle, the flow is regulated entirely by the suction differential, or the difference in suction between the location immediately adjacent the tip of the nozzle and that in the top of the fuel reservoir. From this it will be understood that in order that there may be a discharge from the tip of the fuel nozzle, the suction must be greater at this point than in the top of the fuel reservoir, since if there were no suction differential or if the suction were balanced, there would be no flow from the nozzle and consequently the feed of the liquid fuel to the carbureter for purposes of supplying the explosive mixture where the fuel reservoir is located as shown in the drawing, must depend upon maintaining a greater degree of suction immediately surrounding the tip of the fuel nozzle, than in the top of the fuel reservoir.

While the differential of pressure must be maintained so as to permit the fuel to be drawn out at the nozzle tip, it must be understood that pressure in the top of reservoir 12 is never so high that the fuel will not be drawn into the reservoir through the valve 19 by the suction which supplies the fuel nozzle. This feature of supplying the reservoir 12 from the supply tank (not shown) by suction is fully as important as is the differential of pressure in feeding the fuel from the nozzle.

The air suction raises the sleeve 28 proportionate to the degree of suction, and when the sleeve 28 is raised, the apertures 25 are first uncovered, whereby air will flow through the air inlet member 6, the valve 7 being properly adjusted, into the tubular member 26 and also into the tubular member 27, when the sleeve 28 is raised above the base of the frusto-conical member 26 (see Fig. 2), in which figure the relative elevation of the tubular member 28 is rather pronounced and possibly exaggerated so far as working conditions are concerned. The operation thus described provides a primary supply of air which flows past the tip of the nozzle 9 to atomize the fuel, the flow of air past the tip being restricted by the contracted portion 27 of the member 26, whereby to increase the suction and velocity of the air at this point, to facilitate the atomizing of the fuel. When the air suction increases above a certain degree, the sleeve 28 in being raised farther will be moved away from the shoulder 23, thus permitting air to flow upwardly between the members 26 and 28 as heretofore explained, to provide a secondary supply of air. Thus as the air suction is accelerated beyond a certain degree, a secondary supply of air is admitted into the carbureter in gradually increasing amount to mix with the carbureted air flowing through the part 27, and as the air suction decreases, the sleeve 28 will return or move downwardly toward its normal position, first shutting off the secondary supply of air, and then if the suction decreases further or is stopped, the sleeve 28 will cover the apertures 25. The air suction will also tend to suck the fuel from the reservoir out of the fuel nozzle, and said air suction will also extend through the adjustable member 44 into the upper portion of the reservoir 12, thereby tending to create a vacuum in the reservoir 12, which serves to suck the fuel from the fuel tank (not shown) into the reservoir 12, even though the fuel tank is at a considerably lower level than the carbureter. The adjustment of the perforated tubular member 44 for the purpose of regulating the suction in the upper portion of the fuel reservoir 12 has already been described. When the apertures 25 are not covered, either with a low or high air suction, the flow of air through the portion 27 will be practically the same under the various conditions, thus making provision for a practically uniform partial vacuum within the reservoir 12 which is in communication with the air suction passage through the medium of the perforated adjustable member 44 as heretofore explained.

Attention is called to the fact that the primary object of the adjustable member 44, is to produce sufficient suction in the top of the fuel reservoir 12 to keep said reservoir automatically supplied at all times with the necessary liquid fuel, said suction in the top of the reservoir being sufficient to draw this fuel from the supply tank which it is assumed is located at a relatively low point on the machine as in the rear thereof and considerably below the level of the fuel reservoir 12. This function is accomplished by reason of the fact that the member 44 projects into the path of the air passage, the suction being produced by the rush of air past the perforations in said member 44. Hence it is practicable to regulate the degree of the suction within the top of the reservoir 12 by varying the position of the perforations as heretofore explained.

Having thus described my invention, what I claim is:

1. A carbureter having an air passage, a throttle valve controlling the flow of air into said passage, a fuel reservoir, a fuel nozzle communicating with the reservoir and projecting within said passage and a pressure-controlling member communicating at one end with the upper portion of the reservoir and having its other end projecting into the said air passage, said pressure-controlling member being perforated on one side only and rotatably adjustable to change the direction of the perforated portion, and a stationary casing also located within the air passage and adjacent and in contact with said member to coöperate therewith to regulate the pressure transmitted therethrough by rotary adjustment thereof.

2. A carbureter having an air passage, a fuel reservoir, a fuel nozzle communicating with the fuel reservoir and with the air passage, a rotary pressure controlling member for establishing communication between the upper portion of the reservoir and the air passage, said rotary member extending out into the air passage and having an opening therein, a passage connecting said opening with the fuel reservoir whereby the pressure in the reservoir is controlled therethrough, said opening being adapted to be directed toward or away from the air currents and means to rotate said member to change the direction of said opening with respect to the air currents to vary the pressure in the fuel reservoir in accordance with the requirements of the motor.

3. A carbureter comprising a casing having an air passage, a fuel reservoir, means for conducting fuel from the reservoir to the air passage, a pressure controlling member for establishing communication between the upper portion of the reservoir and the air passage and extending out into the air passage, said extending portion of the member having an opening therein adapted to be directed toward or away from the air currents, a passage connecting said opening with said fuel reservoir and through which the pressure in the reservoir is controlled, said member being adjustable to change the direction of the opening with respect to said air currents to vary the pressure in said reservoir, in accordance with the requirements of the motor.

4. A carbureter comprising a casing having an air passage, a fuel reservoir, a fuel nozzle communicating with the fuel reservoir and with the air passage, means for varying the air pressure on the fuel in the reservoir in accordance with the requirement of a motor, said means compressing a tubular member, one end of which projects into the air passage and the other end of which is in communication with the upper part of the fuel reservoir, the portion of said tube extending into the air passage being provided with one or more openings in one side thereof, and means for rotating said tubular member so as to change the direction of said openings with respect to the air currents in said passage whereby the relationship between the air currents and the pressure on said fuel may be varied at will.

In testimony whereof I affix my signature, in presence of two witnesses.

WILLIAM J. EN EARL.

Witnesses:
MARY HIGGINS,
A. EBERT O'BRIEN.